United States Patent
Tian et al.

(10) Patent No.: US 12,331,163 B2
(45) Date of Patent: Jun. 17, 2025

(54) METHOD FOR PREPARING POLYORGANOSILOXANES

(71) Applicant: WACKER CHEMIE AG, Munich (DE)

(72) Inventors: Shuai Tian, Shanghai (CN); Huifeng Duan, Shanghai (CN); Heng Yang, Shanghai (CN)

(73) Assignee: Wacker Chemie AG, Munich (DE)

( * ) Notice: Subject to any disclaimer, the term of this patent is extended or adjusted under 35 U.S.C. 154(b) by 829 days.

(21) Appl. No.: 17/608,518

(22) PCT Filed: May 6, 2019

(86) PCT No.: PCT/CN2019/085595
§ 371 (c)(1),
(2) Date: Nov. 3, 2021

(87) PCT Pub. No.: WO2020/223863
PCT Pub. Date: Nov. 12, 2020

(65) Prior Publication Data
US 2022/0227944 A1 Jul. 21, 2022

(51) Int. Cl.
*C08G 77/16* (2006.01)
*C08G 77/04* (2006.01)
(Continued)

(52) U.S. Cl.
CPC .............. *C08G 77/16* (2013.01); *C08G 77/08* (2013.01); *C08G 77/10* (2013.01); *C08G 77/18* (2013.01); *C08G 77/20* (2013.01); *C08G 77/38* (2013.01)

(58) Field of Classification Search
None
See application file for complete search history.

(56) References Cited

U.S. PATENT DOCUMENTS

| | | | |
|---|---|---|---|
| 3,542,901 A | 11/1970 | Cooper et al. | |
| 5,109,093 A * | 4/1992 | Rees | C08G 77/08 528/14 |
| 2003/0216536 A1 | 11/2003 | Levandoski et al. | |

FOREIGN PATENT DOCUMENTS

| | | |
|---|---|---|
| CN | 102782014 A | 11/2012 |
| CN | 103467745 A | 12/2013 |

(Continued)

OTHER PUBLICATIONS

Barrere et al., "Anionic polymerization of octamethylcyclotetrasiloxane in miniemulsion II. Molar mass analyses and mechanism scheme," Polymer, vol. 42, p. 7239-7246 (2001) (Year: 2001).*

(Continued)

*Primary Examiner* — Ha S Nguyen

(57) ABSTRACT

The present disclosure relates to a method for preparing polyorganosiloxanes, comprising the following steps: a) reacting together a hydroxyl-terminated polysiloxane and a dialkoxysilane or an oligomer thereof in the presence of Catalyst 1, and b) reacting the product of Step a) with an endcapper in the presence of Catalyst 2 to form the poly-organosiloxane. According to this method, poly-organosiloxanes with an appropriate degree of the polymerization and viscosity are prepared by the polycondensation and equilibration reactions sequentially, and can significantly reduce the viscosity, and improve the flowability and thermal conductivity of the resulting silicone compositions, compared with other polysiloxanes at the same high thermally conductive filler loading.

17 Claims, 1 Drawing Sheet

(51) Int. Cl.
  *C08G 77/06* (2006.01)
  *C08G 77/08* (2006.01)
  *C08G 77/10* (2006.01)
  *C08G 77/18* (2006.01)
  *C08G 77/20* (2006.01)
  *C08G 77/38* (2006.01)

(56) References Cited

FOREIGN PATENT DOCUMENTS

| | | | | |
|---|---|---|---|---|
| CN | 104231276 A | | 12/2014 | |
| CN | 105727829 A | * | 7/2016 | .......... B01F 17/0078 |
| CN | 105838079 A | * | 8/2016 | |
| CN | 106589378 A | | 4/2017 | |
| CN | 107868253 A | * | 4/2018 | |
| JP | H02235933 A | | 9/1990 | |
| JP | 2012092336 A | | 5/2012 | |
| TW | 200900143 A | | 1/2009 | |
| WO | 2001083592 A1 | | 11/2001 | |

OTHER PUBLICATIONS

The method for preparing long chain alkyl silicone oil using hydrogen silicone oil as a starting material in the last third paragraph, p. 413, Synthesis and Application of Organic Silicon Products [M], Beijing: Chemical Industry Press, 2009, Lai Guoqiao, Xing Songmin et al.).

* cited by examiner

METHOD FOR PREPARING POLYORGANOSILOXANES

FIELD OF THE INVENTION

The present disclosure relates to a method for preparing polyorganosiloxanes.

BACKGROUND OF THE INVENTION

Over recent years, the electric vehicle industry has rapidly grown. Power batteries are recognized as a key technology for electric vehicles. Since the increasing temperature of power battery modules can lead to deterioration of battery performance, which reduces the safety, reliability and service life of electric vehicles, heat dissipation is crucial for power batteries. Typically, the route for heat management starts from heating elements, via thermal interface materials, to a heat sink. The improvement in heat dissipation requires a reduction in the thermal resistance of thermal interface materials. In general, this can be realized by, for example, increasing the thermal conductivity, and reducing the bond line thickness, of thermal interface materials, and reducing thermal contact resistance.

Thermal interface materials are mainly composed of a polymer-based matrix and thermally conductive fillers. Since the polymer matrix, for example, organopolysiloxane, is usually not a good heat conductor, it is necessary to enhance its thermal conductivity by adding thermally conductive fillers. However, a high level of thermally conductive fillers added into the existing polyorganosiloxanes in order to achieve a high thermal conductivity cannot result in silicone compositions that allow for a thin bond line at a low assembly pressure, creating a low thermal resistance path. In addition, the highly filled silicone compositions tend to have an increased viscosity (i.e. decreased flowability), and thus cannot fill tiny gaps perfectly, thereby limiting their thermal conductivity. Therefore, it is still necessary to develop a polyorganosiloxane that has a lower viscosity even at a high filler loading to achieve better thermal conductivity and processing properties.

CN105838079A discloses a thermally conductive silicone grease composition containing 30-40 parts of a vinyl silicone oil and 100-500 parts of thermally conductive fillers, wherein the vinyl silicone oil is prepared by equilibrating octamethylcyclotetrasiloxane and divinyltetramethyldisiloxane at 110-120° C. for several hours, and then heating the resulting mixture to 150° C. to remove low boilers. In order to lower the migration rate of the vinyl silicone oil in the thermally conductive silicone grease, tetramethyltetraalkylcyclotetrasiloxane prepared with tetramethylcyclotetrasiloxane and C3-C16 olefins via hydrosilylation is introduced to the above equilibration reaction. Compared with using the vinyl silicone oil containing C3-C16 alkyl groups, the thermally conductive silicone grease composition prepared using methyl vinyl silicone oils with a lower viscosity has a higher thermal conductivity.

At present, vinyl silicone oils are mainly prepared by a method similar to that disclosed in CN105838079A, that is, prepared with low molecular weight cyclosiloxanes and divinyltetramethyldisiloxane via an equilibration reaction, during which catalytic cleavage and random rearrangement of siloxane bonds occur. Although the desired polysiloxane structure can be obtained, the resulting product contains a substantial proportion of cyclosiloxanes and linear oligomeric siloxane, which cannot be completely removed even after vacuum distillation. In real-world applications, these small molecules will volatilize from the product, affecting its performance.

To lower the proportion of cyclosiloxanes in the equilibrium product, attempts have been made to use linear siloxanes as a starting material in prior arts. However, this method tends to produce larger molecular linear vinyl polysiloxanes. For example, CN106589378A discloses a vinyl phenyl polysiloxane obtained by the equilibration reaction of hydroxyl-terminated methylphenyl oligomer, with a degree of polymerization of 30, and divinyltetramethyldisiloxane at 175° C. for 7 h, which has a degree of polymerization of 4,360 and a viscosity of 195,000 mPa·s.

In order to avoid catalytic cleavage and random rearrangement of siloxane bonds during the equilibration process, it is proposed in prior arts that an organosilicon compound having ≡Si—OH groups is condensed with an organosilicon compound containing ≡Si—OR groups. For example, in U.S. Pat. No. 5,109,093A Example 2, a hydroxyl-terminated polydimethylsiloxane with a degree of polymerization of 11 is condensed with tetradecylmethyldimethoxysilane and methylvinyldimethoxysilane at 120° C. for 4 h, to prepare hydroxyl and methoxy-terminated polydimethylsiloxanes containing tetradecyl and vinyl groups and having a structural unit number of 33. In CN104231276A, a low-viscosity hydroxyl-terminated polydimethylsiloxane is condensed with dimethylvinylalkoxysilane to prepare a vinyl-terminated polydimethylsiloxane, and the effect of charge ratio between the two starting materials on the product's viscosity and vinyl content is investigated.

SUMMARY OF THE INVENTION

For the existing problems in the prior arts, the present disclosure provides a method for preparing polyorganosiloxanes, which can achieve at least one or more of the following purposes:
  i) to dramatically reduce the proportion of undesired cyclosiloxanes in the equilibrium product by using a linear hydroxyl-terminated polysiloxane as a starting material to carry out an equilibration reaction;
  ii) to prepare polyorganosiloxanes with an appropriate degree of polymerization and viscosity by the polycondensation reaction between a hydroxyl-terminated polysiloxane and a dialkoxysilane or oligomer thereof having alkyl groups with 6 or more carbon atoms, and subsequently by the chain scission and rearrangement in the equilibration process; and
  iii) to obtain polyorganosiloxanes that can significantly lower the viscosity, and improve the flowability, of the resulting silicone compositions, compared with other polysiloxanes at the same high thermally conductive filler loading, which can facilitate the filling of tiny gaps and achieve a thin bond line at a low assembly pressure, thereby improving the thermal conductivity of the composition.

In the present disclosure, the term "equilibration" refers to the rearrangement of molecular chains of a silicone compound until a balance in the arrangement of siloxane units is obtained. The term "equilibration reaction" refers to the reaction of rearrangement of molecular chains of a silicone compound until an equilibrium of the molecular distribution of siloxane is obtained.

The term "endcapper" in the present disclosure refers to a reagent containing groups such as vinyl that are capable of reacting with active terminal groups of polysiloxanes to make the polysiloxane molecular chains not to grow any longer. A typical structural formula of the "endcapper" used herein is described below.

In the present disclosure, the "structural formula" of the polysiloxane is determined by $^1$H NMR spectroscopy (Nuclear Magnetic Resonance) and optional $^{29}$Si NMR spectroscopy, unless otherwise specified. In $^1$H NMR spectroscopy, hydrogen-bonded atoms and functional groups can be determined by referring to a well-known database and literature; while $^{29}$Si NMR is further used to verify or determine hydrogen-bonded atoms and groups that cannot be accurately determined by $^1$H NMR spectroscopy. When analyzing the molecular composition of polysiloxane, first the baseline of $^1$H NMR spectrum is leveled then the signal peaks of different kinds of hydrogen are integrated for more than three times to find the peak area with a relative integral deviation <1%. In the case when $^{29}$Si NMR spectroscopy is required, the signal peak area of different kinds of silicon is determined by the same method, and then the signal peak areas of hydrogen and silicon are converted in proportion to calculate the number of moles of each group unit of the polysiloxane. Finally, the structural formula of the polysiloxane is determined by end-group analysis. Generally, the structural formula determined by NMR spectroscopy is an average molecular formula. It is true that the structural formula of the polysiloxane of the present disclosure can be determined using a publicly available NMR spectroscopy method. However, in order to obtain high quality NMR spectra to facilitate the analysis of the structural formula of the polysiloxane, preference is given to deuterated chloroform as the test solvent and to tetramethylsilane (TMS)-free chloroform as the internal standard substance for $^1$H NMR spectroscopy, as well as to deuterated benzene as the test solvent and to chromium acetylacetonate as the relaxation reagent for $^{29}$Si NMR spectroscopy.

In the present disclosure, "number average molecular weight" (Mn) is determined by NMR spectroscopy, unless otherwise specified.

In the present disclosure, "dynamic viscosity" is measured at 25° C. according to DIN 51562, unless otherwise specified.

The present disclosure provides a method for preparing polyorganosiloxanes, comprising the following steps:
a) reacting together a hydroxyl-terminated polysiloxane of Formula I and a dialkoxysilane of Formula II or an oligomer thereof in the presence of Catalyst 1,

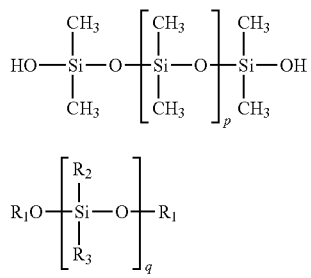

where p is an arbitrary integer between 10 and 60,
$R_1$ is a methyl or ethyl group,
$R_2$ is a C6-C18 alkyl group,
$R_3$ is a C1-C18 alkyl group,
q is an arbitrary integer between 1 and 8;

b) reacting the product of Step a) with an endcapper in the presence of Catalyst 2 to form the polyorganosiloxane.

Further, in Formula I, p can be 15, 20, 25, 30, 35, 40, 45, 50 or 55, especially an arbitrary integer between 15 and 55, for example between 20 and 50.

In Formula II, $R_1$ is preferably a methyl group.
$R_2$ can be hexyl, octyl, decyl, dodecyl, tetradecyl, hexadecyl, octadecyl, especially a C6-C16 alkyl group, more especially a C6-C12 alkyl group.
$R_3$ can be methyl, ethyl, propyl, butyl, pentyl, or a C6-C18 alkyl group which is the same as or different from $R_2$.
q can be 1, 2, 3 or 4, especially 1.

The polyorganosiloxane prepared by the method of the present disclosure has a structural formula as shown in Formula III below:

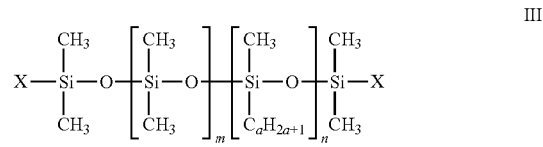

where a is an arbitrary integer between 6 and 18,
n is an arbitrary number between 0.7 and 20,
m is an arbitrary number between 10 and 1500,
m/n is an arbitrary number greater than 20,
X represents one or more groups selected from among vinyl, alkoxy and hydroxyl.

Further, in Formula III, a can be 6, 8, 10, 12, 14, 16 or 18, especially an arbitrary integer between 6 and 16, more especially an arbitrary integer between 6 and 12.
n can be an arbitrary number between 0.7 and 3, between 4 and 8, between 9 and 14, or between 15 and 20, especially an arbitrary number between 0.7 and 3, for example between 0.7 and 1.2.
m can be an arbitrary number between 10 and 220, between 220 and 380, between 380 and 660, between 660 and 850, between 850 and 1000, or between 1000 and 1500.
m/n is an arbitrary number greater than 20, for example 20, 50, 100, 150, 200, 300, 500, 700, 900, 1100, 1300, or 1500.

All of the terminal group X can be vinyl, alkoxy or hydroxyl; or part of the terminal group X is vinyl and the remainder is alkoxy; or part is vinyl and the remainder is hydroxyl, or part is alkoxy and the remainder is hydroxyl; or part is vinyl, part is alkoxy and the remainder is hydroxyl.

In one embodiment herein, the polyorganosiloxane prepared by the method of the present disclosure has a structural formula as shown in Formula III, where a is an arbitrary integer between 6 and 18, n is an arbitrary number between 0.7 and 20, m is an arbitrary number between 10 and 380, for example between 60 and 220, and m/n is an arbitrary number between 20 and 500, for example between 50 and 300; X represents one or more groups selected from among vinyl, alkoxy and hydroxyl. In a more particular embodiment herein, the polyorganosiloxane has a structural formula as shown in Formula III, where a is an arbitrary integer between 6 and 18, n is an arbitrary number between 0.7 and 20, m is an arbitrary number between 10 and 160, for example between 60 and 160, and m/n is an arbitrary number between 20 and 150, for example between 50 and 150; X represents one or more groups selected from among vinyl, alkoxy and hydroxyl.

In another embodiment herein, the polyorganosiloxane prepared by the method of the present disclosure has a structural formula as shown in Formula III, where a is an arbitrary integer between 6 and 18, n is an arbitrary number between 0.7 and 20, m is an arbitrary number between 380 and 850, for example between 380 and 660, and m/n is an arbitrary number between 20 and 1200, for example between 50 and 900; X represents one or more groups selected from among vinyl, alkoxy and hydroxyl.

In still another embodiment herein, the polyorganosiloxane prepared by the method of the present disclosure has a structural formula as shown in Formula III, where a is an arbitrary integer between 6 and 18, n is an arbitrary number between 0.7 and 20, m is an arbitrary number between 850 and 1500, for example between 850 and 1200, and m/n is an arbitrary number between 20 and 1700, for example between 50 and 1500; X represents one or more groups selected from among vinyl, alkoxy and hydroxyl.

In one embodiment herein, the polyorganosiloxane prepared by the method of the present disclosure has a structural formula as shown in Formula III, where a is an arbitrary integer between 6 and 18, n is an arbitrary number between 0.7 and 20, m is an arbitrary number between 10 and 1500, m/n is an arbitrary number greater than 20, and part of X are alkoxy groups. In the foregoing embodiment, in particular, at least 20 mol %, for example 35 mol % or 45 mol %, of X, based on the total number of moles of the X groups, are alkoxy groups. The percentages above are determined by $^1$H NMR spectroscopy and optional $^{29}$Si NMR spectroscopy. Specifically, it is converted by the ratio of the peak area of all hydrogen signals from the R groups in

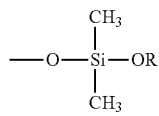

to that of all hydrogen signals from the X groups in

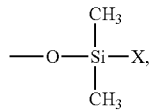

where R represents an alkyl group, X represents one or more groups selected from among vinyl, alkoxy and hydroxyl.

In another embodiment herein, the polyorganosiloxane prepared by the method of the present disclosure has a structural formula as shown in Formula III, where a is an arbitrary integer between 6 and 18, n is an arbitrary number between 0.7 and 20, m is an arbitrary number between 10 and 1500, m/n is an arbitrary number greater than 20, and part of X are vinyl groups. In the foregoing embodiment, in particular, at least 45 mol %, for example 55 mol % or 65 mol %, of X, based on the total number of moles of the X groups, are vinyl groups. The percentages above are determined by $^1$H NMR spectroscopy and optional $^{29}$Si NMR spectroscopy, as described in details in the foregoing method regarding alkoxy.

In still another embodiment herein, the polyorganosiloxane prepared by the method of the present disclosure has a structural formula as shown in Formula III, where a is an arbitrary integer between 6 and 18, n is an arbitrary number between 0.7 and 20, m is an arbitrary number between 10 and 1500, m/n is an arbitrary number greater than 20, and part of X are vinyl groups and part of X are alkoxy groups. In the foregoing embodiment, in particular, at least 55 mol % of X are vinyl groups and at least 35 mol % of X are alkoxy groups; or at least 45 mol % of X are vinyl groups and at least 45 mol % of X are alkoxy groups; or at least 65 mol % of X are vinyl groups and at least 20 mol % of X are alkoxy groups, all percentages being based on the total number of moles of the X groups. In any one of the foregoing embodiments, in particular, at least 55 mol % of X are vinyl groups, at least 35 mol % of X are alkoxy groups and at most 10 mol % of X are hydroxyl groups; or at least 45 mol % of X are vinyl groups, at least 45 mol % X are alkoxy groups and at most 10 mol % of X are hydroxyl groups; or at least 65 mol % of X are vinyl groups, at least 20 mol % of X are alkoxy groups and at most 10 mol % of X are hydroxyl groups, all percentages being based on the total number of moles of the X groups. The percentages above are determined by $^1$H NMR spectroscopy and optional $^{29}$Si NMR spectroscopy, as described in details in the foregoing method regarding alkoxy.

The polyorganosiloxane prepared by the method of the present disclosure has a dynamic viscosity at 25° C. of suitably less than 1000 mPa·s, for example, less than 900, 800, 700, 600, 500, 400, 300 or 200 mPa·s, preferably from 10 to 200 mPa·s. Where the viscosity of the polyorganosiloxane is too low, the silicone composition filled with thermally conductive fillers is prone to settling, while a too high viscosity of the polyorganosiloxane results in a silicone composition that has no significant viscosity reducing effect at the same filler loading.

The polyorganosiloxane prepared by the method of the present disclosure has a weight-average molecular weight (Mw) of suitably less than 60,000 g/mol, for example, less than 50,000, 40,000 or 30,000 g/mol, especially between 5,000 and 20,000 g/mol. The number-average molecular weight (Mn) is suitably less than 30,000 g/mol, for example, less than 25,000, 20,000 or 15,000 g/mol, especially between 3,000 and 10,000 g/mol. The polydispersity index Mw/Mn is suitably between 1.5 and 2.0, for example, between 1.6 and 2.0, or between 1.7 and 1.9.

The polyorganosiloxanes prepared by the method of the present disclosure includes a single polyorganosiloxane compound, and a combination of two or more polyorganosiloxane compounds. For each individual polyorganosiloxane molecule, m and n are integers within the above-mentioned ranges, and, in the X groups, either one listed above accounts for 100%, or one accounts for 50% and another one accounts for 50%; however, for a mixture of two or more different polyorganosiloxane compounds, m and n are positive numbers within the above-mentioned ranges, which represent an average value, and, in the X groups, percentages of individual ones listed above can be any figure in the range of 0-100%, which represent an average value and the total percentage of all X groups is 100%.

In a preferred embodiment herein, the polyorganosiloxane prepared by the method of the present disclosure has the structural formula as shown in Formula III, where a is an arbitrary integer between 6 and 18, m is an arbitrary number between 60 and 160, n is an arbitrary number between 0.7 and 3, m/n is an arbitrary number between 50 and 150, and at least 20 mol % of X are alkoxy groups. In another more particular embodiment, the polyorganosiloxane has the structural formula as shown in Formula III, where a is an arbitrary integer between 6 and 16, m is an arbitrary number between 70 and 100, n is an arbitrary number between 0.7 and 1.2, m/n is an arbitrary number between 70 and 130, and at least 65 mol % of X are vinyl groups and at least 20 mol % of X are alkoxy groups.

Examples of polyorganosiloxanes prepared by the method of the present disclosure include, but are not limited to:

$((H_2C=CH)(CH_3)_2SiO)_{1.54}((CH_3)_2SiO)_{89.50}((CH_3)(C_8H_{17})SiO)_{0.99}(Si(OCH_3)(CH_3)_2)_{0.46}$, $((H_2C=CH)(CH_3)_2SiO)_{1.43}((CH_3)_2SiO)_{77.89}((CH_3)(C_8H_{17})SiO)_{0.81}(Si(OCH_3)(CH_3)_2)_{0.57}$, $((H_2C=CH)(CH_3)_2SiO)_{1.46}((CH_3)_2SiO)_{78.89}((CH_3)(C_8H_{17})SiO)_{0.81}(Si(OCH_3)(CH_3)_2)_{0.54}$, $((H_2C=CH)(CH_3)_2SiO)_{1.00}((CH_3)_2SiO)_{150.10}((CH_3)(C_8H_{17})SiO)_{1.50}(Si(OCH_3)(CH_3)_2)_{1.00}$, $((H_2C=CH)(CH_3)_2SiO)_{1.20}((CH_3)_2SiO)_{133.40}((CH_3)(C_{12}H_{25})SiO)_{1.40}(Si(OCH_3)(CH_3)_2)_{1.00}$, and $((H_2C=CH)(CH_3)_2SiO)_{1.36}((CH_3)_2SiO)_{76.70}((CH_3)(C_8H_{17})SiO_{0.85}(Si(OCH_3)(CH_3)_2)_{0.64}$.

In Step a), the dialkoxysilane or oligomer thereof is used in an amount such that it can provide 0.2-0.5 moles, preferably 0.3-0.4 moles, of alkoxy groups per mole of silanol groups in the hydroxyl-terminated polysiloxane.

In Step a), the reaction is typically a polycondensation reaction, which is carried out preferably at 80-100° C., more preferably at 85-95° C., for a period of preferably 2-4 h.

In order to increase the degree of polymerization, the polycondensation is advantageously carried out at a reduced pressure to extract small molecular alcohols and water generated therefrom, wherein the pressure is reduced below 100 mbar, for example, below 80 mbar or below 60 mbar.

In Step b), the endcapper has the typical structural formula as shown in Formula IV or V below:

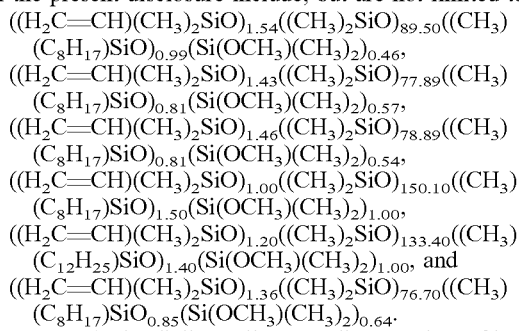

IV

V where, n is an arbitrary number between 0 and 20, preferably 0; and $R_4$ is a C1-C6 alkyl group, for example, methyl, ethyl, propyl, butyl, especially ethyl.

The endcapper is used in an amount such that it can provide 0.2-0.5 moles, preferably 0.25-0.4 moles, of vinyl groups per mole of silanol groups in the hydroxyl-terminated polysiloxane.

In one embodiment herein, the endcapper has the structural formula as shown in Formula IV. In a more particular embodiment herein, the endcapper has the structural formula as shown in Formula IV, where t=0.

In Step b), the reaction is typically an equilibration reaction, which is carried out preferably at 100-140° C., especially at 110-130° C., for a period of preferably 3-6 h. Generally, the longer the equilibration reaction proceeds, the more uniform the reaction tends to be. However, the above reaction time is preferred considering the cost.

In Step a), Catalyst 1 includes basic catalysts, for example, alkali metal hydroxides (e.g. potassium hydroxide), quaternary ammonium hydroxides (e.g. tetramethylammonium hydroxide) and hydrates thereof, and acidic catalysts, preferably basic catalysts. Catalyst 1 can be used in the form of a pure substance, i.e. a solid, or in the form of a solution such as an aqueous or ethanol solution, preferably an aqueous solution. Catalyst 1 should be used in a minimum amount required to ensure an effective polycondensation reaction.

In Step b), Catalyst 2 includes basic and acidic catalysts, which can be the same as or different from Catalyst 1. Catalyst 2 should be used in a minimum amount required to ensure an effective equilibration reaction. In order to avoid the introduction of more catalyst impurities that are more difficult to remove subsequently, Catalyst 2 is preferably the same as Catalyst 1. In this case, to simplify the feeding operation, Catalyst 2 in Step b) can be fed together with Catalyst 1 in Step a). At this time, the total amount of the catalysts, based on solid form, ranges preferably from 0.01 to 0.05 wt %, more preferably from 0.02 to 0.04 wt %, relative to the weight of the hydroxyl-terminated polysiloxane.

In Steps a) and b), the polycondensation reaction and the equilibration reaction are suitably carried out in the absence of water, and further in the absence of water and a solvent. The term "in the absence of" herein means that water or a solvent is present in the reaction system in an amount of lower than 0.1 wt %, for example, lower than 0.05 wt %.

The preparation method of the present disclosure can further comprise Step c) of removing the catalysts to minimize the effect of catalyst impurities on product performance. Generally, acidic catalysts are neutralized with alkaline substances such as ammonia gas, alkali metal hydroxide catalysts neutralized with acidic substances such as phosphoric acid, and quaternary ammonium hydroxide catalysts pyrolysed, for example, at 150-170° C. for 0.5-2 h. As the salts formed from acidic catalysts and alkaline substances or from alkali metal hydroxides and acidic substances may give rise to non-transparent polyorganosiloxanes, a quaternary ammonium hydroxide is preferably used as the catalyst in the present disclosure.

In the present disclosure, Steps a), b) and c) are advantageously performed in the presence of an inert atmosphere, that is usually a nitrogen or argon atmosphere.

To further improve the quality of polyorganosiloxane products, the preparation method of the present disclosure also comprises Step d) of removing low boilers, including small molecular cyclosiloxanes, methanol, water, and unreacted dialkoxysilanes or oligomers thereof, preferably by vacuum distillation at a suitable pressure below 100 mbar, for example below 60 mbar, below 30 mbar, and at a suitable temperature of 140-190° C., for example, 150-180° C., 160-180° C., or 170-180° C.

The present disclosure further provides polyorganosiloxanes prepared by the above method.

The present disclosure further provides use of the polyorganosiloxanes prepared by the above method in thermal interface materials for electric vehicles, electronic components, semiconductors, chips, consumer electronics, communication and computers, especially for electric vehicles where they can effectively cool batteries, ECUs, motors, electronic components, etc.

DETAILED DESCRIPTION OF THE PREFERRED EMBODIMENTS

Figure 1A:
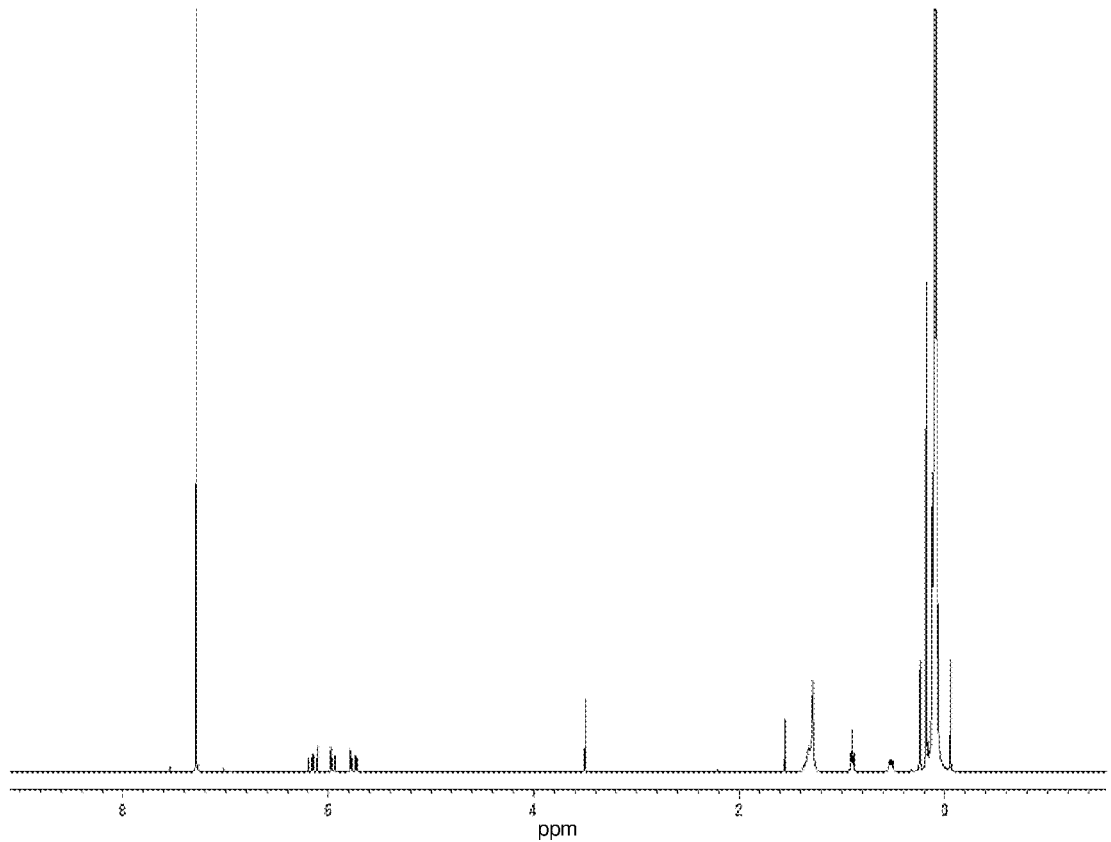
FIG. 1 shows a $^1$H NMR spectrum (1a) and a $^{29}$Si NMR spectrum (1b) of the polyorganosiloxane Polymer A-1 obtained in Example 1.
Figure 1B:
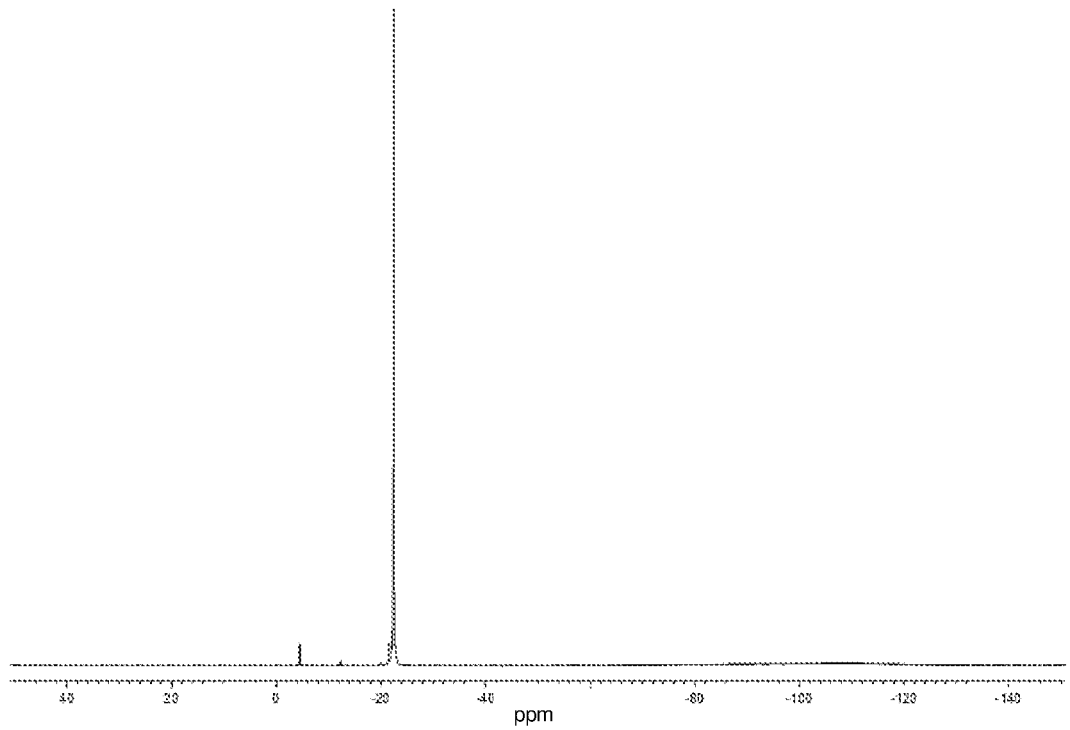

The present invention is further illustrated by the following examples, but is not limited to the scope thereof. Any experimental methods with no conditions specified in the following examples are selected according to the conventional methods and conditions, or product specifications.

Characterization of structural formula and number-average molecular weight of polyorganosiloxanes Determined by $^1$H NMR spectroscopy and $^{29}$Si NMR spectroscopy.

$^1$H NMR spectroscopy
Test solvent: deuterated chloroform
Internal standard substance: TMS-free chloroform
Spectrometer: Bruker Avance III HD 400
Sampling head: 5 mm BBO probe
Measured Parameters:
Pulse sequence (Pulprog)=zg30
TD=65536
NS=64
DS=2
SWH=7211.54 Hz
FIDRES=0.11 Hz
AQ=4.54 s
RG=86.97
DW=69.33 µs
DE=6.50 µs
TE=298.2 K
D1=5 s
SFO1=400.15 MHz Some measurement parameters may need to be adjusted appropriately depending on the type of spectrometer.

$^{29}$Si NMR spectroscopy
Test solvent: deuterated benzene
Relaxation reagent: chromium acetylacetonate
No internal standard substance added
Spectrometer: Bruker Avance III HD 400
Sampling head: 5 mm BBO probe
Measured Parameters:
Pulse sequence=zgig60
TD=65536
NS=2048
DS=4
SWH=16025.64 Hz
FIDRES=0.24 Hz
AQ=2.04 s
RG=196.53
DW=31.20 µs
DE=13.00 µs
TE=298.1 K
D1=5 s
SFO1=79.49 MHz Some measurement parameters may need to be adjusted appropriately depending on the type of spectrometer.

Each group unit of the polyorganosiloxane and the number of moles thereof are obtained primarily by $^1$H NMR integration, and the type of groups is further determined by $^{29}$Si NMR spectroscopy. When performing an integration, first the baseline of NMR spectrum is leveled, then the peak integration interval is selected, in which each peak is integrated for more than three times to calculate the average peak area with the relative deviation <1%. Finally, the molecular composition of the polysiloxane is analyzed by end-group method to obtain the structural formula of the polysiloxane, whereby its number-average molecular weight is calculated.

Determination of Viscosity of the Silicone Composition

It is carried out in accordance with DIN EN ISO 3219: Determination of viscosity of polymers and resins in the liquid state or as emulsions or dispersions using a rotational viscometer with defined shear rate (ISO 3219:1993).

The raw materials used in the following examples are all commercially available, with detailed information as follows:

WACKER® FINISH WS 62 M, a hydroxyl-terminated polydimethylsiloxane having a dynamic viscosity of 50-110 mPa·s, measured at 25° C. according to DIN 51562, supplied by Wacker Chemicals;

Basic catalyst, an aqueous solution of tetramethylammonium hydroxide at a concentration of 25 wt %;

Endcapper, vinyltetramethyldisiloxane, supplied by TCI;

ELASTOSIL® VINYLPOLYMER 120, a polydimethylsiloxane containing vinyl groups, having a dynamic viscosity of 120 mPa·s measured at 25° C., supplied by Wacker Chemicals;

Alumina A, spherical alumina powder having an average particle size of 40 µm;

Alumina B, spherical alumina powder having an average particle size of 5 µm;

Alumina C, spherical alumina powder having an average particle size of 20 µm;

Alumina D, spherical alumina powder having an average particle size of 2 µm;

Zinc oxide, non-spherical zinc oxide powder having an average particle size of 5 µm;

WACKER® AK 100, a polydimethylsiloxane having a kinematic viscosity of about 100 mm$^2$/s measured at 25° C. according to DIN 53019, supplied by Wacker Chemicals.

Unless otherwise specified, "wt %" in the table below is based on the total weight of the thermally conductive silicone composition.

Example 1: Preparation of Polyorganosiloxanes Polymer A (a) The hydroxyl-terminated polysiloxane, dialkoxysilane and basic catalyst were added to a flask under a nitrogen atmosphere, stirred and heated to 80-100° C. to carry out a polycondensation reaction for 2-4 h;

(b) The endcapper was added to the flask under a nitrogen atmosphere, and heated to 100-140° C. to carry out an equilibration reaction for 3-6 h;

(c) The resulting mixture was further heated to 160° C. to decompose the catalyst for 1 h under a nitrogen atmosphere;

(d) The above resulting mixture was transferred to a distillation flask, distilled at 175° C. and 30 mbar for 2 h to remove low boilers (mostly small molecular cyclosiloxanes), and finally cooled to room temperature to obtain the polyorganosiloxane.

Table 1 lists the amount of raw materials and process parameters for each Polymer A variant.

Table 2 lists the structural formula, number-average molecular weight, and dynamic viscosity at 25° C. of each Polymer A variant determined by $^1$H NMR spectroscopy and $^{29}$Si NMR Spectroscopy.

TABLE 1

| | Polymer A-1 | Polymer A-2 | Polymer A-3 | Polymer A-4 |
|---|---|---|---|---|
| WACKER ® FINISH WS 62 M (Kg) | 1264 | 680 | 565 | 680 |
| Octyldimethoxymethylsilane (Kg) | 37.2 | 20 | 17 | / |
| Dodecyldiethoxymethylsilane (Kg) | / | / | / | 25 |
| Basic catalyst (Kg) | 1.05 | 0.6 | 0.62 | 0.6 |
| Endcapper (Kg) | 29.76 | 16 | 50 | 16 |

TABLE 1-continued

| | Polymer A-1 | Polymer A-2 | Polymer A-3 | Polymer A-4 |
|---|---|---|---|---|
| Polycondensation temperature (° C.) | 95 | 85 | 85 | 85 |
| Polycondensation time (h) | 2 | 2 | 2 | 2 |
| Equilibration temperature (° C.) | 120 | 120 | 120 | 120 |
| Equilibration time (h) | 3.5 | 3 | 3 | 3 |

TABLE 2

| | Structural Formula | Mn (g/mol) | Viscosity (mPa · s) |
|---|---|---|---|
| Polymer A-1 | $((H_2C=CH)(CH_3)_2SiO)_{1.54}((CH_3)_2SiO)_{89.50}((CH_3)(C_8H_{17})SiO)_{0.99}(Si(OCH_3)(CH_3)_2)_{0.46}$ | 6989.8 | 130 |
| Polymer A-2 | $((H_2C=CH)(CH_3)_2SiO)_{1.46}((CH_3)_2SiO)_{78.89}((CH_3)(C_8H_{17})SiO)_{0.81}(Si(OCH_3)(CH_3)_2)_{0.54}$ | 6171.7 | 124 |
| Polymer A-3 | $((H_2C=CH)(CH_3)_2SiO)_{1.00}((CH_3)_2SiO)_{150.10}((CH_3)(C_8H_{17})SiO)_{1.50}(Si(OCH_3)(CH_3)_2)_{1.00}$ | 11555.4 | NA |
| Polymer A-4 | $((H_2C=CH)(CH_3)_2SiO)_{1.20}((CH_3)_2SiO)_{133.40}((CH_3)(C_{12}H_{25})SiO)_{1.40}(Si(OCH_3)(CH_3)_2)_{0.80}$ | 10243.2 | 240 |

Among all the Polymer A variants, Polymer A-1 has a polydispersity index (Mw/Mn) of 1.826, which was determined by PSS SECcurity gel permeation chromatography with reference to DIN 55672, using tetrahydrofuran as the eluent.

Example 2: Thermal Conductivity Test

According to the formulation in Table 3, the polyorganosiloxanes Polymer A-1, Polymer B (ELASTOSIL® VINYLPOLYMER 120) and thermally conductive fillers were mixed to obtain thermally conductive silicone Compositions N-1 to N-4'. The viscosities of the compositions were measured at shear rates of 0.5 s$^{-1}$ and 25 s$^{-1}$. The results show that Polymer A-1 is more effective in reducing the viscosity of the composition than Polymer B at the same thermally conductive filler loading.

TABLE 3

| Components (wt %) | Composition N-1 | Composition N-2 | Composition N-3 | Composition N-4' |
|---|---|---|---|---|
| Polymer A-1 | 10 | 10 | 15 | / |
| Polymer B | / | / | / | 15 |
| Alumina A | 60 | / | / | / |
| Alumina B | 30 | / | 85 | 85 |
| Alumina C | / | 60 | / | / |
| Alumina D | / | 30 | / | / |
| Viscosity of Composition (mPa · s) | | | | |
| D = 0.5 s$^{-1}$ | 17600 | 41600 | 132000 | 423000 |
| D = 25 s$^{-1}$ | 13800 | 12700 | 36500 | 81300 |

According to the formulation in Table 4, the polyorganosiloxanes Polymers A-1, A-2, A-4, Polymer B and thermally conductive fillers were mixed to obtain thermally conductive silicone compositions N-5 to N-8'. The viscosities of the compositions were measured at a shear rate of 10 s$^{-1}$. The results show that Polymer A, the polyorganosiloxanes of the present disclosure, are more effective in reducing the viscosity of the composition than Polymer B at the same thermally conductive filler loading, while Polymer A-1 is slightly superior to Polymers A-2 and A-4 in reducing viscosity.

TABLE 4

| Components (wt %) | Composition N-5 | Composition N-6 | Composition N-7 | Composition N-8' |
|---|---|---|---|---|
| Polymer A-1 | 10 | / | / | / |
| Polymer A-2 | / | 10 | / | / |
| Polymer A-4 | / | / | 10 | / |
| Polymer B | / | / | / | 10 |
| Alumina A | 25 | 25 | 25 | 25 |
| Alumina B | 36 | 36 | 36 | 36 |

TABLE 4-continued

| Components (wt %) | Composition N-5 | Composition N-6 | Composition N-7 | Composition N-8' |
|---|---|---|---|---|
| Zinc oxide | 29 | 29 | 29 | 29 |
| Viscosity of Composition (mPa · s) | | | | |
| D = 10 s$^{-1}$ | 72000 | 100000 | 128000 | 580000 |

In Table 5, the viscosity reducing effect of the polyorganosiloxane Polymer A-1 is compared with that of Polymer C (a silicone oil with the structural formula $(CH_3)_3SiO((CH_3)_2SiO)_{80}((CH_3)(C_8H_{17})SiO)_2Si(CH_3)_3$, characterized by NMR spectroscopy, and a dynamic viscosity of 100 mPa·s measured at 25° C., which is prepared with reference to "The method for preparing long chain alkyl silicone oil using hydrogen silicone oil as a starting material" in the last third paragraph, Page 413, *Synthesis and Application of Organic Silicon Products* [M], Beijing: Chemical Industry Press, 2009, Lai Guoqiao, Xing Songmin et al.) at the same thermally conductive filler loading. The results show that Polymer A-1 is more effective in reducing the viscosity than Polymer C.

TABLE 5

| Components (wt %) | Composition N-5 | Composition N-9' |
|---|---|---|
| Polymer A-1 | 10 | / |
| Polymer C | / | 10 |
| Alumina A | 25 | 25 |
| Alumina B | 36 | 36 |
| Zinc oxide | 29 | 29 |
| Viscosity of Composition (mPa · s) | | |
| D = 1 s$^{-1}$ | 422000 | 687000 |

Table 6 investigates the viscosity changes of the polyorganosiloxanes Polymer A-1 and Polymer D (WACKER® AK 100) at a thermally conductive filler loading of 90% and 91%. The results show that Polymer A-1 can significantly reduce the viscosity, and thus improve the flowability and processability, of the resulting compositions, compared with Polymer D at the same thermally conductive filler loading.

In addition, for the compositions with the same viscosity, Polymer A-1 accepts a higher level of thermally conductive fillers than Polymer D, thereby increasing the thermal conductivity of the composition. It should be noted that Polymer D is well known for its bleeding-out tendency during the molding, storage and use of a thermally conductive silicone composition thereof.

TABLE 6

| Components (wt %) | Composition N-5 | Composition N-10 | Composition N-11' | Composition N-12' |
|---|---|---|---|---|
| Polymer A-1 | 10 | 9 | / | / |
| Polymer D | / | / | 10 | 9 |
| Alumina A | 25 | 25.3 | 25 | 25.3 |
| Alumina B | 36 | 36.4 | 36 | 36.4 |
| Zinc oxide | 29 | 29.3 | 29 | 29.3 |
| Viscosity of Composition (mPa · s) | | | | |
| D = 10 s⁻¹ | 72000 | 122000 | 130000 | 184000 |

The invention claimed is:

1. A method for preparing polyorganosiloxanes, comprising the followings steps:
   a) reacting together a hydroxyl-terminated polysiloxane of Formula I and a dialkoxysilane of Formula II or an oligomer thereof in the presence of Catalyst 1,

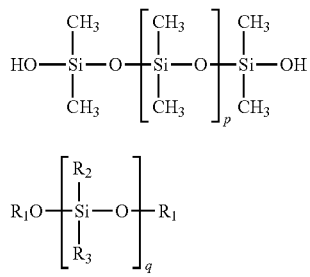

where p is an arbitrary integer between 10 and 60,
R₁ is a methyl or ethyl group,
R₂ is a C6-C18 alkyl group,
R₃ is a C1-C18 alkyl group,
q is an arbitrary integer between 1 and 8;
   b) reacting the product of Step a) by a chain scission reaction with an endcapper in the presence of Catalyst 2 to form the said polyorganosiloxane;
   wherein the endcapper has the structural formula as shown in Formula IV and/or V below:

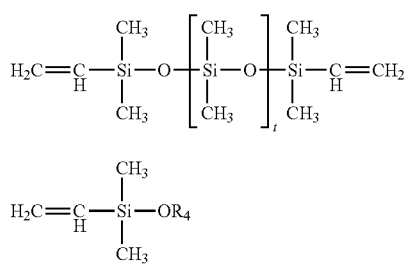

where t is an arbitrary integer between 0 and 20, and R₄ is a C1-C6 alkyl group, and
   wherein the endcapper is used in an amount to provide 0.2-0.5 moles of vinyl groups per mole of silanol groups in the hydroxyl-terminated polysiloxane.

2. The method of claim 1, wherein the reaction of Step a) is a polycondensation reaction, and/or a equilibration reaction occurs in Step b).

3. The method of claim 1, wherein the polyorganosiloxane has the structural formula as shown in Formula III below:

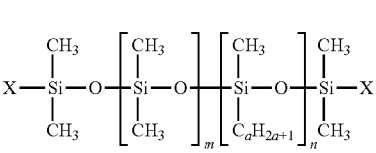

where a is an arbitrary integer between 6 and 18,
n is an arbitrary number between 0.7 and 20,
m is an arbitrary number between 10 and 1500,
m/n is an arbitrary number greater than 20,
X represents one or more groups selected from among vinyl, alkoxy and hydroxyl.

4. The method of claim 3, wherein part of X are alkoxy groups.

5. The method of claim 4, wherein at least 20 mol % of X, based on the total number of moles of the X groups, are alkoxy groups.

6. The method of claim 3, wherein part of X are vinyl groups.

7. The method of claim 6, wherein at least 45 mol % of X, based on the total number of moles of the X groups, are vinyl groups.

8. The method of claim 3, wherein at least 65 mol % of X and at least 20 mol % of X, based on the total number of moles of the X groups, are respectively vinyl groups and alkoxy groups.

9. The method of claim 3, wherein m is an arbitrary number between 10 and 380 and m/n is an arbitrary number between 20 and 500.

10. The method of claim 9, wherein m is an arbitrary number between 60 and 160 and m/n is an arbitrary number between 50 and 150.

11. The method of claim 3, wherein the polyorganosiloxane of Formula III has a dynamic viscosity of from 10 to 200 mPa·s at 25° C.

12. The method of claim 1, wherein the dialkoxysilane or oligomer thereof is used in an amount such that it can provide 0.2-0.5 moles of alkoxy groups per mole of silanol groups in the hydroxyl-terminated polysiloxane.

13. The method of claim 1, wherein the reaction of Step a) is carried out at 80-100° C.

14. The method of claim 1, wherein both R₁ and R₃ in Formula II are methyl groups, and q is 1.

15. The method of claim 1, wherein the reaction of Step b) is carried out at 100-140° C.

16. The method of claim 1, wherein both Catalyst 1 and Catalyst 2 are quaternary ammonium hydroxides.

17. The method of claim 16, wherein the total amount of Catalysts 1 and 2, based on solid form, ranges from 0.01 to 0.05 wt %, relative to the weight of the hydroxyl-terminated polysiloxane.

* * * * *